United States Patent
Cui et al.

(10) Patent No.: US 11,555,390 B2
(45) Date of Patent: Jan. 17, 2023

(54) HIGH AND LOW PRESSURE MANIFOLD LIQUID SUPPLY SYSTEM FOR FRACTURING UNITS

(71) Applicant: YANTAI JEREH PETROLEUM EQUIPMENT & TECHNOLOGIES CO., LTD., Yantai Shandong (CN)

(72) Inventors: Shuzhen Cui, Yantai Shandong (CN); Yibo Jiang, Yantai Shandong (CN); Chunqiang Lan, Yantai Shandong (CN); Kun Zhang, Yantai Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/205,388

(22) Filed: Mar. 18, 2021

(65) Prior Publication Data
US 2022/0228468 A1 Jul. 21, 2022

(30) Foreign Application Priority Data
Jan. 18, 2021 (CN) .......................... 202120125688.1

(51) Int. Cl.
*E21B 43/26* (2006.01)
*F16K 31/122* (2006.01)

(52) U.S. Cl.
CPC .......... *E21B 43/26* (2013.01); *E21B 43/2607* (2020.05); *F16K 31/122* (2013.01)

(58) Field of Classification Search
CPC ..... E21B 43/26; E21B 43/2607; F16K 31/122
See application file for complete search history.

(56) References Cited

U.S. PATENT DOCUMENTS

2016/0326854 A1 11/2016 Broussard et al.
2017/0074074 A1 3/2017 Joseph et al.
(Continued)

FOREIGN PATENT DOCUMENTS

CN 104302958 A 1/2015
CN 110513097 A 11/2019
(Continued)

OTHER PUBLICATIONS

International Search Report and Written Opinion dated Sep. 28, 2021, for International Application No. PCT/CN2021/072539, 5 pages.

*Primary Examiner* — James G Sayre
(74) *Attorney, Agent, or Firm* — Crowell & Moring LLP (57) ABSTRACT

The present disclosure relates to a high and low pressure manifold liquid supply system for fracturing units, including: a trailer, a high and low pressure manifold arranged on the trailer, a support frame arranged on a platform of the trailer, and a power distribution switch cabinet arranged on the support frame, which is configured to be electrically connected to the electrically-driven fracturing units and configured to distribute electricity to the electrically-driven fracturing units. Through the high and low pressure manifold liquid supply system integrated with electricity supply facilities therein according to the present disclosure, the electrically-driven fracturing units are powered, in this way, the electricity supply and distribution system in the well site can be effectively simplified, the connection distance of the cables can be shorten, and further the time spent on connection can be saved, thereby improving the well site layout efficiency.

20 Claims, 3 Drawing Sheets

(56) References Cited

U.S. PATENT DOCUMENTS

| | | | |
|---|---|---|---|
| 2018/0284817 A1 | 10/2018 | Cook et al. | |
| 2019/0211814 A1* | 7/2019 | Weightman | E21B 41/00 |
| 2020/0040705 A1* | 2/2020 | Morris | E21B 43/26 |
| 2020/0109617 A1* | 4/2020 | Oehring | F02B 63/06 |

FOREIGN PATENT DOCUMENTS

| | | | |
|---|---|---|---|
| CN | 110821464 A | 2/2020 | |
| WO | WO-2021003178 A1 * | 1/2021 | E21B 43/2607 |

* cited by examiner

Fig. 1

(Prior Art)

HIGH AND LOW PRESSURE MANIFOLD LIQUID SUPPLY SYSTEM FOR FRACTURING UNITS

FIELD

The present disclosure relates to the technical field of oil and gas field fracturing, more specifically, to a high and lower pressure manifold liquid supply system for fracturing units.

BACKGROUND

In a fracturing operation site of oil and gas field, a power supply and transmission system of a traditional fracturing unit typically includes: a diesel engine as a power source, a fracturing plunger pump as an actuator, and a gearbox as well as a transmission shaft connected therebetween for transmitting power. However, the diesel engine as the power source has disadvantages of, for example, low power, large volume, high fuel costs, as well as waste gas pollution and noise pollution. Apart from this, the well site layout using the diesel engine as the power source occupies a large area. Therefore, the use of electric motors instead of diesel engines as well as transmissions thereof for directly driving fracturing units has gradually become a new trend in development which has gradually been spotted in practical applications. When electrically-driven fracturing units are employed, there arise new problems, such as complicated connection of the electricity distribution system at the well site, a long connection distance, a time-consuming connection process, and the like. In addition, since electrical interfaces of the electrically-driven fracturing units are arranged at the head portions of the electrically-driven fracturing trailers for carrying the electrically-driven fracturing units while the fracturing fluid connection interfaces of the electrically-driven fracturing units are arranged at the rear portions of the electrically-driven fracturing trailers, therefore causing hindrances for moving the electrically-driven fracturing trailers.

Figure 1:
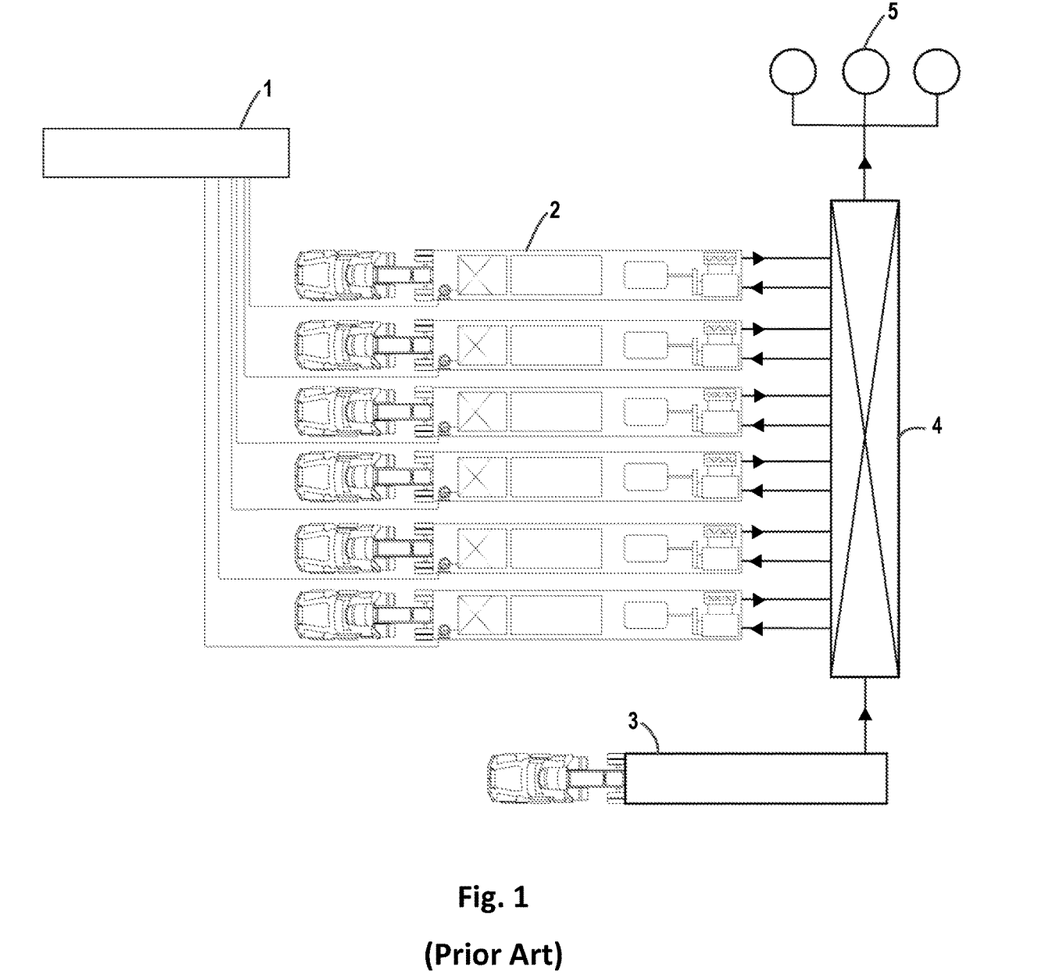
FIG. 1 illustrates a diagram of a well site layout according to the prior art.

FIG. 1 illustrates a diagram of a well site layout according to the prior art, where a power supply system 1 is typically located at a position distant away from electrically-driven fracturing trailers and electrically connected to electrical interfaces in a vicinity of head portions (i.e., the left side in FIG. 1) of the electrically-driven fracturing trailers via multiple long cables to supply electricity to electrically-driven fracturing units 2, low pressure fracturing fluid provided by electrically-driven sand mixing units 3 on electrically-driven sand mixing trailers are delivered via a high and low pressure manifold 4 to fluid interfaces in a vicinity of rear portions (i.e., the right side in FIG. 1) of the electrically-driven fracturing trailers, and the electrically-driven fracturing units 2 pressurize low pressure fracturing fluid into high pressure fracturing fluid and deliver high pressure fracturing fluid back to the high and low pressure manifold 4 and further to a wellhead 5 via the high and low pressure manifold 4. Given the fact that each electrically-driven fracturing unit 2 needs to be separately electrically connected to the power supply system 1, a large number of cables are required in such arrangement. Moreover, for the electrically-driven fracturing units 2, connection interfaces are provided in the vicinity of both the head and rear portions of the trailers, thus resulting in complicated connection and causing hindrances for moving the electrically-driven fracturing trailers.

As a result, there is a need for improving the electricity supply and distribution system of the well site to at least partly solve the foregoing problems.

SUMMARY

The objective of the present disclosure is to provide a high and low pressure manifold liquid supply system for fracturing units, which can simplify the electricity distribution layout, save the well site space, and facilitate operations.

According to an aspect of the present disclosure, the high and lower pressure manifold liquid supply system comprises:

a trailer comprising a platform;

a high and low pressure manifold arranged on the platform and configured to deliver low pressure fracturing fluid from one or more sand mixing units to a plurality of electrically-driven fracturing units and to receive high pressure fracturing fluid from the plurality of electrically-driven fracturing units;

a support frame arranged on the platform; and a distribution switch cabinet fixed on the support frame and configured to distribute electricity to the plurality of electrically-driven fracturing units.

According to the present disclosure, the generator set is only required to be connected to the distribution switch cabinet of the high and low pressure manifold liquid supply system, without the necessity of separately connecting to each electrically-driven fracturing unit. In this way, the amount of cables required for connecting the electrically-driven fracturing units can be significantly reduced, thus simplifying the connection complexity of the electrically-driven fracturing units.

In an embodiment, the high and low pressure manifold comprises:

a low pressure manifold comprising one or more low pressure inlets in fluid communication with the one or more sand mixing units to receive the low pressure fracturing fluid from the one or more sand mixing units, and a plurality of low pressure outlets in fluid communication with the plurality of electrically-driven fracturing units to deliver the low pressure fracturing fluid to the plurality of electrically-driven fracturing units;

a high pressure manifold comprising a plurality of high pressure inlets in fluid communication with the plurality of electrically-driven fracturing units to receive the high pressure fracturing fluid from the plurality of electrically-driven fracturing units, and one or more high pressure outlets in fluid communication with a wellhead to deliver the high pressure fracturing fluid to the wellhead.

According to the present disclosure, the high and low pressure manifold liquid supply system can simultaneously perform the functions of delivering fracturing fluid and supplying electricity.

In an embodiment, the plurality of low pressure outlets are arranged at both lateral sides of the high and low pressure manifold, and the plurality of high pressure inlets are arranged at both lateral sides of the high and low pressure manifold.

According to the present disclosure, the high and low pressure manifold at both lateral sides can be connected to the electrically-driven fracturing units, thereby increasing the number of the electrically-driven fracturing units and improving the operation efficiency.

In an embodiment, the distribution switch cabinet comprises:

a power input interface configured to be electrically connected to a generator set to receive power supplied by the generator set;

a plurality of electrical junction boxes configured to be electrically connected to the plurality of electrically-driven fracturing units, respectively, to deliver the power to the plurality of electrically-driven fracturing units; and a plurality of distribution switches configured to distribute electricity to the plurality of electrically-driven fracturing units.

According to the present disclosure, the high and low pressure manifold can perform an electricity distribution function for the plurality of electrically-driven fracturing units when delivering fracturing fluid.

In an embodiment, the high and low pressure manifold liquid supply system further comprises:

a plurality of prefabricated low flow-pressure cables and a plurality of prefabricated high flow-pressure cables, for electrically connecting the distribution switch cabinet with the plurality of electrically-driven fracturing units.

According to the present disclosure, the plurality of electrically-driven fracturing units can be directly electrically connected to the high and low pressure manifold, without the necessity of connecting to the generator set distant away, thereby reducing the number of connection cables.

In an embodiment, the low flow-pressure cables are arranged adjacent to a low pressure fluid pipeline connected between the plurality of low pressure outlets and the electrically-driven fracturing units and fixed on the low pressure fluid pipeline, and the high flow-pressure cables are arranged adjacent to a high pressure fluid pipeline connected between the plurality of high pressure inlets and the electrically-driven fracturing units and fixed on the high pressure fluid pipeline.

According to the present disclosure, the cables are arranged adjacent to the fluid pipelines connected between the electrically-driven fracturing units and the high and low pressure manifold, to render the high and low pressure manifold liquid supply system more compact.

In an embodiment, the sand mixing units are electrically-driven sand mixing units, and the distribution switch cabinet is further configured to distribute electricity to the sand mixing units.

According to the present disclosure, the sand mixing units can be directly electrically connected to the high and low pressure manifold, without the necessity of connecting to the generator set distant away, thereby reducing the number of connection cables.

In an embodiment, the electrical junction boxes are further electrically connected to the sand mixing units, and the distribution switches are further configured to distribute electricity to the sand mixing units.

According to the present disclosure, the high and low pressure manifold can perform an electricity distribution function for the sand mixing units when delivering fracturing fluid.

In an embodiment, the electrically-driven fracturing units are arranged on electrically-driven fracturing trailers, and the low pressure manifold and the high pressure manifold are in fluid communication with fluid inlets and outlets of the electrically-driven fracturing units located in a vicinity of rear portions of the electrically-driven fracturing trailers via the low pressure fluid pipeline and the high pressure fluid pipeline respectively.

In the embodiment, the low flow-pressure cables and the high flow-pressure cables are electrically connected to electrical interfaces of the electrically-driven fracturing units located in the vicinity of the rear portions of the electrically-driven fracturing trailers, respectively.

According to the present disclosure, the electrical interfaces of the electrically-driven fracturing units and the fluid inlets and outlets are all located in the vicinity of rear portions of the electrically-driven fracturing trailers, thereby simplifying the connection process, without causing hindrances for moving the electrically-driven trailers.

In an embodiment, the generator set is a gas turbine generator set, and a fuel consumed by the gas turbine generator set may be a compressed natural gas (CNG) or a liquefied natural gas (LNG).

According to the present disclosure, the electrically-driven fracturing operation in a well site can be more environment-friendly and more efficient.

In an embodiment, the generator set is a gas turbine generator set, and a fuel consumed by the gas turbine generator set is a wellhead gas.

According to the present disclosure, the well site generator set may directly take use of wellhead gas, thereby reducing costs.

BRIEF DESCRIPTION OF THE DRAWINGS

In order to better understand the above and other objectives, features and advantages of the present disclosure, preferred embodiments as shown in the accompanied drawings are provided. Throughout the drawings, the same or similar reference signs refer to the same or similar elements. It would be appreciated by those skilled in the art that the drawings are provided to illustrate the preferred embodiments of the present disclosure, without suggesting any limitation to the scope of the present disclosure, and respective components therein are not drawn to scale.

REFERENCE SIGNS 1 generator set
2 electrically-driven fracturing unit
3 electrically-driven sand mixing unit
4 high and low pressure manifold
5 wellhead
10 generator set
20 electrically-driven fracturing unit
30 sand mixing unit
40 high and low pressure manifold liquid supply system
41 trailer
42 high and low pressure manifold
421 low pressure manifold
4211 low pressure inlet
4212 low pressure outlet
422 high pressure manifold
4221 high pressure inlet
4222 high pressure outlet
423 low pressure fluid pipeline
424 high pressure fluid pipeline
43 support frame
44 distribution switch cabinet 441 electrical junction box
50 wellhead

DETAILED DESCRIPTION OF EMBODIMENTS

Reference will now be made to the drawings to describe in detail the embodiments of the present disclosure. The description here is only about preferred embodiments of the present disclosure, and those skilled in the art would envision, on the basis of the preferred embodiments described herein, other manners that can implement the present disclosure, which also fall into the scope of the present disclosure.

The present disclosure provides a high and low pressure manifold liquid supply system for fracturing units, which is integrated with power supply facilities. Hereinafter, the high and low pressure manifold liquid supply system according to the present disclosure will be described in detail with reference to the accompanied drawings.

Figure 2:
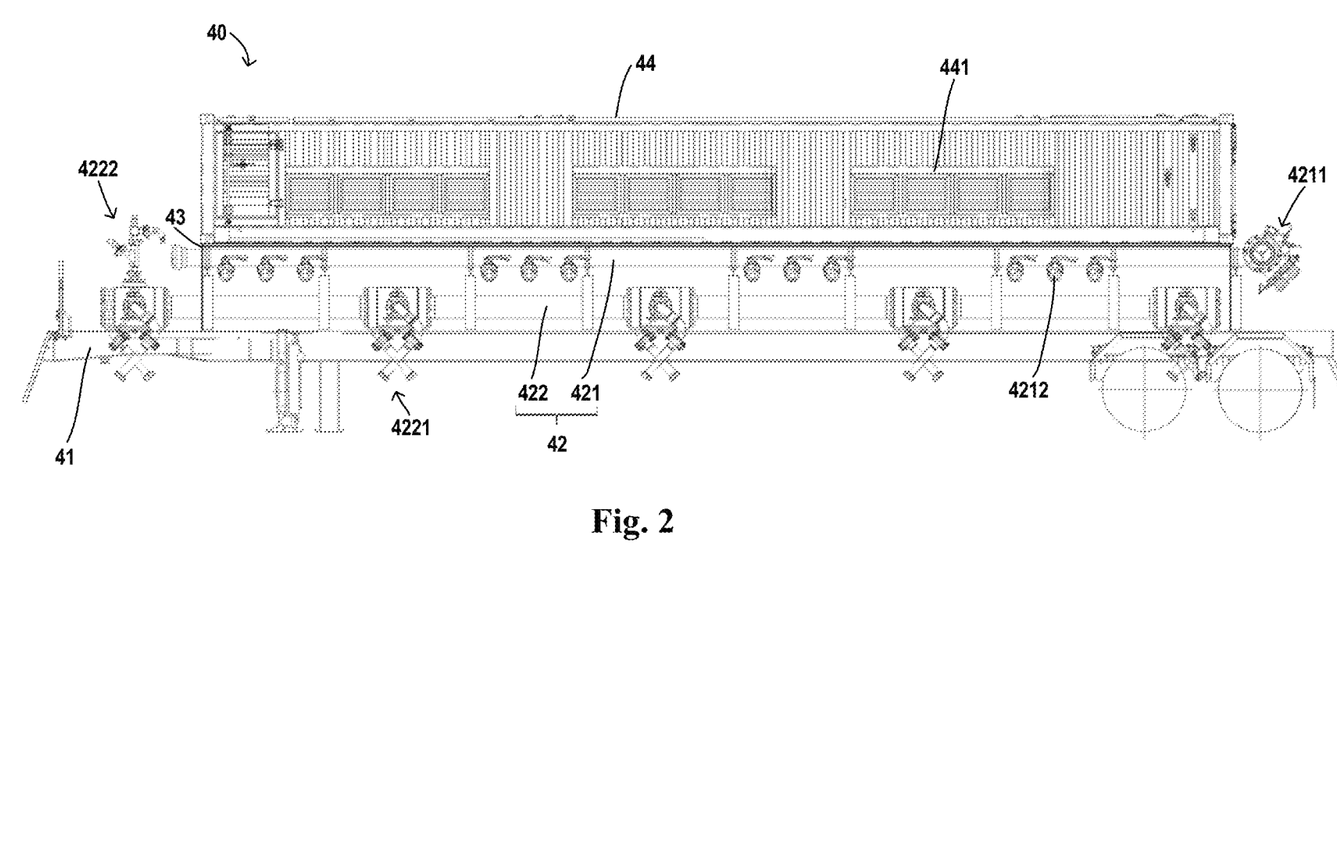
FIG. 2 schematically illustrates a high and low pressure manifold liquid supply system according to the present disclosure.
Figure 3:
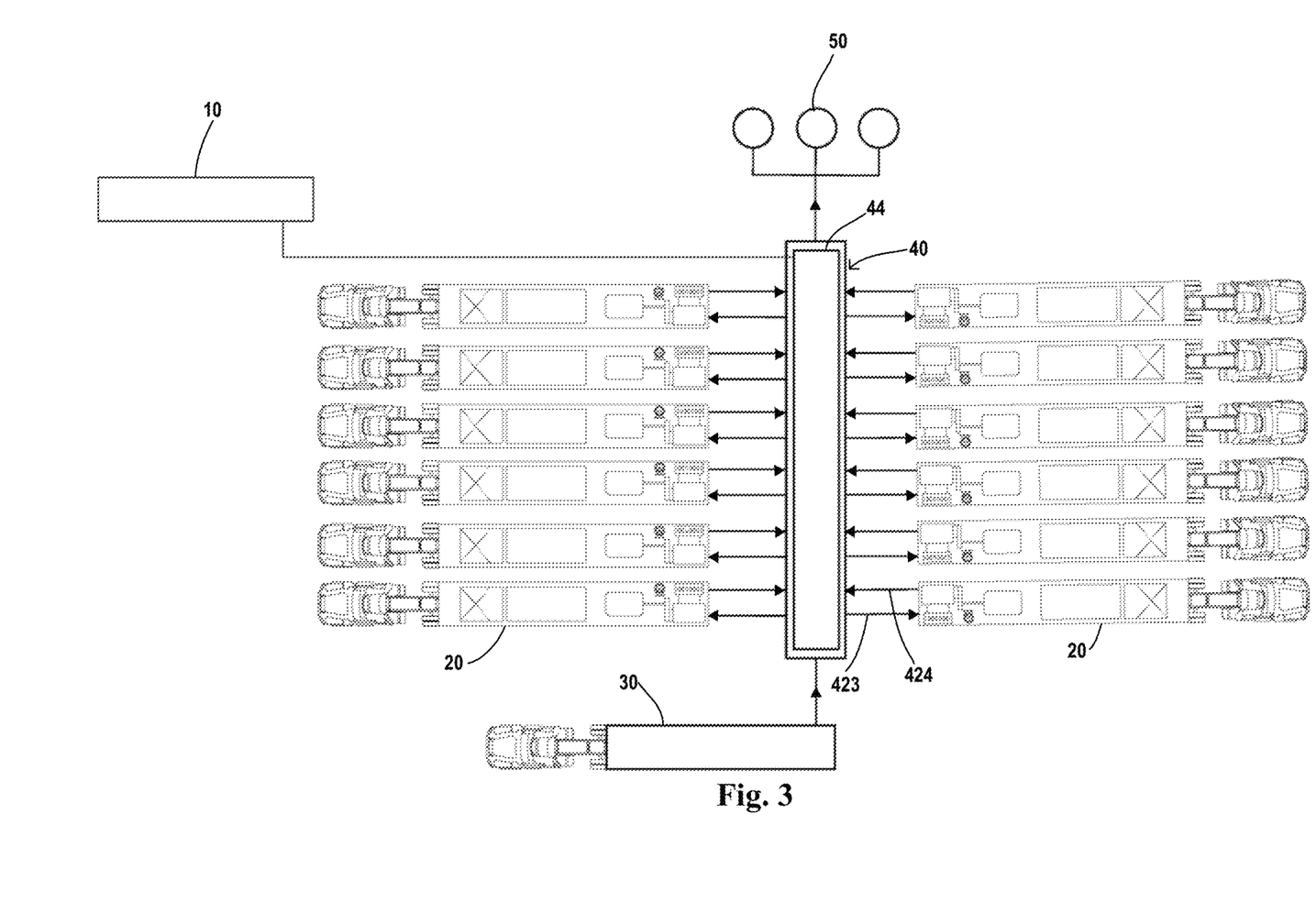
FIG. 3 schematically illustrates a well site layout where a high and low pressure manifold liquid supply system according to the present disclosure is employed.

As shown in FIGS. 2 and 3, the high and low pressure manifold liquid supply system 40 according to the present disclosure includes a trailer 41 having a platform, a high and low pressure manifold 42 arranged on the platform, a support frame 43 arranged on the platform, and distribution switch cabinet 44 arranged on the support frame 43. The upstream of the high and low pressure manifold 42 is in fluid communication with one or more sand mixing units 30 (only one is shown in FIG. 3) to receive low pressure fracturing fluid therefrom, and the downstream of the high and low pressure manifold 42 is in fluid communication with a plurality of electrically-driven fracturing units 20 to deliver the low pressure fracturing fluid to the fracturing units 20. The electrically-driven fracturing units 20 pressurize the low pressure fracturing fluid into high pressure fracturing fluid and then deliver them back to the high and low pressure manifold 42 and further to the wellhead of the oil gas field via the high and low pressure manifold 42, for fracturing operations. In addition, the high and low pressure manifold fluid supply system 40 according to the present disclosure further includes a distribution switch cabinet 44 fixed on the support frame 43 for distributing electricity to the electrically-driven fracturing units 20.

According to a preferred embodiment of the present disclosure, the high and low pressure manifold 42 includes a low pressure manifold 421 for delivering low pressure fracturing fluid and a high pressure manifold 422 for delivering high pressure fracturing fluid. The low pressure manifold 421 is in fluid communication with one or more sand mixing units 30 to receive the low pressure fracturing fluid from the latter, and the low pressure manifold 421 is further in fluid communication with the plurality of electrically-driven fracturing units 20 to deliver the low pressure fracturing fluid to the latter for pressurization. The high pressure manifold 422 is in fluid communication with the plurality of electrically-driven fracturing units 20 to receive high pressure fracturing fluid pressurized by the plurality of electrically-driven fracturing units 20, and collects the high pressure fracturing fluid and delivers them to the wellhead 50 (see FIG. 3).

The low pressure manifold 421 includes one or more low pressure inlets 4211 and a plurality of low pressure outlets 4212, for delivering the low pressure fracturing fluid from the sand mixing units 30 via the low pressure inlets 4211 to the low pressure manifold 421, and then delivering the same via the low pressure outlets 4212 to the electrically-driven fracturing units 20 for pressurization.

The high pressure manifold 422 includes a plurality of high pressure inlets 4221 and one or more high pressure outlets 4222, for delivering the high pressure fracturing fluid pressurized by the electrically driven fracturing units 20 via the high pressure inlets 4221 to the high pressure manifold 422, and then delivering the same via the high pressure outlets 4222 to the wellhead 50.

In a preferred embodiment, the low pressure outlets 4212 of the low pressure manifold and the high pressure inlets 4221 of the high pressure manifold are arranged at both lateral sides of the high and low pressure manifold 42 such that the electrically-driven fracturing units 20 can be connected to the high and low pressure manifold 42 at both lateral sides of the high and low pressure manifold 42.

Further, the low pressure inlets 4211 and the high pressure outlets 4222 are preferably provided at longitudinal ends of the high and low pressure manifold 42 respectively.

According to a preferred embodiment of the present disclosure, the distribution switch cabinet 44 includes a power input interface and a plurality of electrical junction boxes 441, where the power input interface is configured to be electrically connected to the generator set 10 for receiving electricity, and the electrical junction boxes 441 are configured to be electrically connected to the respective electrically-driven fracturing units 20. In addition, the distribution switch cabinet 44 further includes a plurality of distribution switches for performing an electricity distribution operation for the electrically-driven fracturing units 20.

In a preferred embodiment, the high and pressure manifold liquid supply system 40 includes a plurality of prefabricated low flow-pressure cables and a plurality of prefabricated high flow-pressure cables (not shown in figures) to form a current loop between the distribution switch cabinet 44 and the electrically driven fracturing units 20 for delivering the electricity from the distribution switch cabinet 44 to the electrically-driven fracturing units 20. Wherein, the low flow-pressure cables are arranged adjacent to a low pressure fluid pipeline 423 connected between the low pressure outlets 4212 and the electrically-driven fracturing units 20 for delivering the low pressure fracturing fluid to the electrically-driven fracturing units 20, and preferably fixed on the low pressure fluid pipeline 423. The high flow-pressure cables are arranged adjacent to the high pressure fluid pipeline 424 connected between the high pressure inlets 4221 and the electrically-driven fracturing units 2 for delivering the high pressure fracturing fluid to the high pressure manifold 422, and preferably fixed on the high pressure fluid pipeline 424. By prefabricating the high and low flow-pressure electricity supply cables, the connection distance between the units can be reduced, the time spent on connection can be saved, and the well site layout arranging efficiency can be improved. Moreover, the arrangement and movement of the units are free of the influence of the connection cables thus enabling easy detachment from the well site.

In a preferred embodiment, the sand mixing units are electrically-driven sand mixing units, and the distribution switch cabinet 44 can distribute electricity to the sand mixing units 30. In the embodiment, the electrical junction boxes 441 are electrically connected to the sand mixing units 30 via cables which, for example, may be arranged adjacent to the fluid pipeline connected between the electrically-driven sand mixing units 30 and the high and low pressure manifold 42 and fixed thereto. Meanwhile, the distribution switches can perform an electricity distribution operation on the sand mixing units 30.

According to a preferred embodiment of the present disclosure, the electrically-driven fracturing units 20 are arranged on the electrically-driven fracturing trailers, and the low pressure manifold 421 and the high pressure manifold 422 are respectively in fluid communication with the fluid inlets and outlets of the electrically-driven units 20 via the low pressure fluid pipeline 423 and the high pressure fluid pipeline 424, where the fluid inlets and outlets are arranged in vicinity of the rear portions of the electrically-driven fracturing trailers. Moreover, the low flow-pressure cables and the high flow-pressure cables are electrically connected to the electrical interfaces of the electrically-driven fracturing units 20, where the electrical interfaces are also arranged in the vicinity of the rear portions of the electrically-driven fracturing trailers. Such arrangement has the advantage of simplifying the distribution arrangement of the electrically-driven fracturing trailers, thereby simplifying the electrical connection process and reducing hindrances for moving the electrically-driven fracturing trailers.

In a preferred embodiment, the generator set 10 may be a gas turbine generator set, and a fuel consumed by the gas turbine generator set may be a compressed natural gas (CNG), a liquefied natural gas (LNG) or a wellhead gas.

Through the high and low pressure manifold liquid supply system according to the present disclosure, the electrically-driven fracturing units are powered, in this way, the layout of the electricity supply and distribution system of the well site can be effectively simplified, the connection distance of the cables can be shorten, and the time spent on connection can be saved, thereby improving the well site arranging efficiency. In the meantime, since the circuit connections and the fracturing fluid connections are both provided at the rear portions of the electrically-driven fracturing trailers, they will not impact the movement of the electrically-driven fracturing trailers, thus enabling easy detachment from the well site.

The foregoing description on the various embodiments of the present disclosure has been presented to those skilled in the relevant fields for the purpose of illustration, but is not intended to be exhaustive or limited to a single embodiment disclosed herein. As aforementioned, many substitutions and variations will be apparent to those skilled in the art. Therefore, although some alternative embodiments have been described above, those skilled in the art can envision or develop other embodiments according to the present disclosure. The present disclosure is intended to cover all substitutions, modifications and variations of the embodiments described herein, as well as other embodiments falling into the spirits and scope of the present disclosure.

We claim:

1. A high and low pressure manifold liquid supply system (40) for fracturing units, wherein the high and low pressure manifold liquid supply system comprises:
    a platform, wherein the platform includes opposing front and rear ends;
    a high and low pressure manifold (42) arranged on the platform and configured to deliver low pressure fracturing fluid from one or more sand mixing units (30) to a plurality of electrically-driven fracturing units (20) and to receive high pressure fracturing fluid from the plurality of electrically-driven fracturing units (20), wherein the high and low pressure manifold (42) includes one or more low pressure inlets (4211) and one or more high pressure outlets (4222), wherein the one or more low pressure inlets (4211) is configured to receive fracturing fluid from the one or more sand mixing units (30) and is disposed at the rear end of the platform, wherein the one or more high pressure outlets (4222) is configured to receive the high pressure fracturing fluid from the plurality of electrically-driven fracturing units (20) and is disposed at the front end of the platform, wherein the high and low pressure manifold (42) is disposed entirely between the one or more low pressure inlets (4211) and the one or more high pressure outlets (4222);
    a support frame (43) arranged on the platform;
    a distribution switch cabinet (44) fixed on the support frame and configured to distribute electricity to the plurality of electrically-driven fracturing units (20); and
    a plurality of prefabricated low flow-pressure cables and a plurality of prefabricated high flow-pressure cables, for electrically connecting the distribution switch cabinet (44) with the plurality of electrically-driven fracturing units (20);
    wherein the low flow-pressure cables are respectively arranged adjacent to a respective low pressure fluid pipeline (423) for delivering the low pressure fracturing fluid and fixed on the low pressure fluid pipeline, and the high flow-pressure cables are respectively arranged adjacent to a respective high pressure fluid pipeline (424) for delivering the high pressure fracturing fluid and fixed on the high pressure fluid pipeline.

2. The high and low pressure manifold liquid supply system according to claim 1, wherein the high and low pressure manifold (42) comprises:
    a low pressure manifold (421) comprising the one or more low pressure inlets (4211) in fluid communication with the one or more sand mixing units (30) to receive the low pressure fracturing fluid from the one or more sand mixing units, and a plurality of low pressure outlets (4212) in fluid communication with the plurality of electrically-driven fracturing units (20) via the low pressure fluid pipelines (423) to deliver the low pressure fracturing fluid to the plurality of electrically-driven fracturing units;
    a high pressure manifold (422) comprising a plurality of high pressure inlets (4221) in fluid communication with the plurality of electrically-driven fracturing units (20) via the high pressure fluid pipelines (424) to receive the high pressure fracturing fluid from the plurality of electrically-driven fracturing units (20), and the one or more high pressure outlets (4222) in fluid communication with a wellhead (50) to deliver the high pressure fracturing fluid to the wellhead.

3. The high and low pressure manifold liquid supply system according to claim 2, wherein the plurality of low pressure outlets (4212) are arranged on both lateral sides of the high and low pressure manifold (42), and the plurality of high pressure inlets (4221) are arranged on both lateral sides of the high and low pressure manifold (42).

4. The high and low pressure manifold liquid supply system according to claim 3, wherein the distribution switch cabinet (44) comprises:
    a power input interface configured to be electrically connected to a generator set (10) to receive electricity supplied by the generator set;
    a plurality of electrical junction boxes (441) configured to be electrically connected to the plurality of electrically-driven fracturing units (20) respectively, to deliver electricity to the plurality of electrically-driven fracturing units; and a plurality of distribution switches configured to distribute electricity to the plurality of electrically-driven fracturing units (20).

5. The high and low pressure manifold liquid supply system according to claim 4, wherein the electrical junction boxes (441) are further electrically connected to the sand mixing units (30), and the distribution switches are further configured to distribute electricity to the sand mixing units.

6. The high and low pressure manifold liquid supply system according to claim 5, wherein the electrically-driven fracturing units (20) are arranged on electrically-driven fracturing platforms, and the low pressure manifold (421) as well as the high pressure manifold (422) are respectively in fluid communication with fluid interfaces of the electrically-driven fracturing units (20) located in a vicinity of rear portions of the electrically-driven fracturing platforms via the low pressure fluid pipeline (423) and the high pressure fluid pipeline (424).

7. The high and low pressure manifold liquid supply system according to claim 6, wherein the low flow-pressure cables and the high flow-pressure cables are electrically connected to electrical interfaces of the electrically-driven fracturing units (20) located in the vicinity of the rear portions of the electrically-driven fracturing platforms, respectively.

8. The high and low pressure manifold liquid supply system according to claim 4, wherein the generator set (10) is a gas turbine generator set, and a fuel consumed by the gas turbine generator set is a compressed natural gas (CNG) or a liquefied natural gas (LNG).

9. The high and low pressure manifold liquid supply system according to claim 4, wherein the generator set (10) is a gas turbine generator set, and a fuel consumed by the gas turbine generator set is a wellhead gas.

10. The high and low pressure manifold liquid supply system according to claim 1, wherein the sand mixing units (30) are electrically-driven sand mixing units, and the distribution switch cabinet (44) is further configured to distribute electricity to the sand mixing units (30).

11. The high and low pressure manifold liquid supply system according to claim 7, wherein at least one of the electrically-driven sand mixing units (30) includes a platform, wherein the platform includes a wheel.

12. The high and low pressure manifold liquid supply system according to claim 1, wherein the high and low pressure manifold liquid supply system is configured to simultaneously deliver fracturing fluid and supply electricity.

13. The high and low pressure manifold liquid supply system according to claim 1, wherein the platform further comprises a wheel operatively coupled with the platform, wherein the low pressure inlet (4211) is disposed above the wheel.

14. A high and low pressure manifold liquid supply system (40) for fracturing units, wherein the high and low pressure manifold liquid supply system comprises:
a platform;
a high and low pressure manifold (42) arranged on the platform and configured to deliver low pressure fracturing fluid from one or more sand mixing units (30) to a plurality of electrically-driven fracturing units (20) and to receive high pressure fracturing fluid from the plurality of electrically-driven fracturing units (20);
a support frame (43) arranged on the platform;
a distribution switch cabinet (44) fixed on the support frame, wherein the distribution switch cabinet (44) includes a first electrical junction box configured to distribute electricity to the plurality of electrically-driven fracturing units (20), wherein the first electrical junction box is positioned entirely above the high and low pressure manifold (42); and
a plurality of prefabricated low flow-pressure cables and a plurality of prefabricated high flow-pressure cables, for electrically connecting the distribution switch cabinet (44) with the plurality of electrically-driven fracturing units (20), wherein the low flow-pressure cables are respectively arranged adjacent to a respective low pressure fluid pipeline (423) for delivering the low pressure fracturing fluid and fixed on the low pressure fluid pipeline, and the high flow-pressure cables are respectively arranged adjacent to a respective high pressure fluid pipeline (424) for delivering the high pressure fracturing fluid and fixed on the high pressure fluid pipeline.

15. The high and low pressure manifold liquid supply system according to claim 14, wherein the high and low pressure manifold (42) includes one or more low pressure inlets (4211) and one or more high pressure outlets (4222), wherein the one or more low pressure inlets (4211) and the one or more high pressure outlets (4222) are provided at opposing longitudinal ends of the high and low pressure manifold (42).

16. The high and low pressure manifold liquid supply system according to claim 14, wherein the distribution switch cabinet (44) includes second and third electrical junction boxes configured to distribute electricity to the plurality of electrically-driven fracturing units (20), wherein the second and third electrical junction boxes are positioned entirely above the high and low pressure manifold (42).

17. The high and low pressure manifold liquid supply system according to claim 14, wherein the high and low pressure manifold (42) includes one or more low pressure inlets (4211) and one or more high pressure outlets (4222), wherein the high and low pressure manifold (42) is disposed entirely between the one or more low pressure inlets (4211) and the one or more high pressure outlets (4222).

18. A high and low pressure manifold liquid supply system (40) for fracturing units, wherein the high and low pressure manifold liquid supply system comprises:
a platform;
a high and low pressure manifold (42) arranged on the platform and configured to deliver low pressure fracturing fluid from one or more sand mixing units (30) to a plurality of electrically-driven fracturing units (20) and to receive high pressure fracturing fluid from the plurality of electrically-driven fracturing units (20);
a support frame (43) arranged on the platform;
a distribution switch cabinet (44) fixed on the support frame and configured to distribute electricity to the plurality of electrically-driven fracturing units (20); and
a plurality of prefabricated low flow-pressure cables and a plurality of prefabricated high flow-pressure cables, for electrically connecting the distribution switch cabinet (44) with the plurality of electrically-driven fracturing units (20), wherein the low flow-pressure cables are respectively arranged adjacent to a respective low pressure fluid pipeline (423) for delivering the low pressure fracturing fluid and fixed on the low pressure fluid pipeline, and the high flow-pressure cables are respectively arranged adjacent to a respective high pressure fluid pipeline (424) for delivering the high pressure fracturing fluid and fixed on the high pressure fluid pipeline; and an electrically-driven sand mixing unit (30) configured to receive electricity from the distribution switch cabinet (44), wherein the electrically-driven sand mixing unit (30) includes a platform, wherein the platform includes a wheel.

19. The high and low pressure manifold liquid supply system according to claim 18, wherein electrically-driven sand mixing unit (30) is directly electrically connected to the high and low pressure manifold (42).

20. The high and low pressure manifold liquid supply system according to claim 18, wherein the high and low pressure manifold (42) includes one or more low pressure inlets (4211) and one or more high pressure outlets (4222), wherein the high and low pressure manifold (42) is disposed entirely between the one or more low pressure inlets (4211) and the one or more high pressure outlets (4222).

* * * * *

UNITED STATES PATENT AND TRADEMARK OFFICE
CERTIFICATE OF CORRECTION

PATENT NO. : 11,555,390 B2
APPLICATION NO. : 17/205388
DATED : January 17, 2023
INVENTOR(S) : Shuzhen Cui et al.

It is certified that error appears in the above-identified patent and that said Letters Patent is hereby corrected as shown below:

In the Claims

In Column 9, Claim 6, Line 10, delete "claim 5" and replace with --claim 4--.

In Column 9, Claim 11, Line 41, delete "claim 7" and replace with --claim 10--.

Signed and Sealed this
Ninth Day of April, 2024

*Katherine Kelly Vidal*
*Director of the United States Patent and Trademark Office*